United States Patent
Daido et al.

(10) Patent No.: US 9,708,946 B2
(45) Date of Patent: Jul. 18, 2017

(54) DIESEL PARTICULATE FILTER AND EXHAUST GAS PURIFICATION DEVICE

(71) Applicant: Mitsui Mining & Smelting Co., Ltd., Tokyo (JP)

(72) Inventors: Ataru Daido, Saitama (JP); Takahiro Kogawa, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/891,747

(22) PCT Filed: May 22, 2014

(86) PCT No.: PCT/JP2014/063611
§ 371 (c)(1),
(2) Date: Nov. 17, 2015

(87) PCT Pub. No.: WO2014/189115
PCT Pub. Date: Nov. 27, 2014

(65) Prior Publication Data
US 2016/0115835 A1   Apr. 28, 2016

(30) Foreign Application Priority Data

May 22, 2013   (JP) ................................. 2013-107983

(51) Int. Cl.
*F01N 3/035* (2006.01)
*B01D 53/94* (2006.01)
(Continued)

(52) U.S. Cl.
CPC ......... *F01N 3/035* (2013.01); *B01D 46/2418* (2013.01); *B01D 53/94* (2013.01);
(Continued)

(58) Field of Classification Search
None
See application file for complete search history.

(56) References Cited

U.S. PATENT DOCUMENTS 7,337,607 B2 * 3/2008 Hou ..................... F01N 3/0253
60/274
8,052,936 B2   11/2011 Tamani
(Continued)

FOREIGN PATENT DOCUMENTS

DE   102014220879 A1   7/2015
EP      1598102 A1    11/2005
(Continued)

OTHER PUBLICATIONS

International Search Report dated Aug. 26, 2014 filed in PCT/JP2014/063611.
(Continued)

*Primary Examiner* — Walter D Griffin
*Assistant Examiner* — Jelitza Perez
(74) *Attorney, Agent, or Firm* — Rankin, Hill & Clark LLP

(57) ABSTRACT

Provided is a novel DPF which can prevent PM from accumulating on the surface and interior of a filter substrate, and can suppress an increase in back pressure caused by exhaust gas. The DPF has a configuration in which an inorganic porous layer, which includes a metal oxide or a metal composite oxide and provided with surface irregularities having a thickness of at least 50% of the thickness of the inorganic porous layer, is formed on part or all of the surface of the dividing wall on the side where exhaust gas flows in.

10 Claims, 4 Drawing Sheets

(51) Int. Cl.
  *B01J 23/50* (2006.01)
  *B01J 35/04* (2006.01)
  *F01N 3/022* (2006.01)
  *B01J 37/02* (2006.01)
  *B01D 46/24* (2006.01)
  *B01J 23/42* (2006.01)
  *B01J 23/44* (2006.01)
  *B01J 23/46* (2006.01)

(52) U.S. Cl.
  CPC ............ *B01D 53/944* (2013.01); *B01J 23/50* (2013.01); *B01J 35/04* (2013.01); *B01J 37/0248* (2013.01); *F01N 3/0222* (2013.01); *B01D 2255/104* (2013.01); *B01D 2255/1021* (2013.01); *B01D 2255/1023* (2013.01); *B01D 2255/1025* (2013.01); *B01D 2255/9155* (2013.01); *B01D 2258/012* (2013.01); *B01J 23/42* (2013.01); *B01J 23/44* (2013.01); *B01J 23/464* (2013.01)

(56) References Cited

U.S. PATENT DOCUMENTS

| | | |
|---|---|---|
| 2003/0100446 A1 | 5/2003 | Hase |
| 2006/0166820 A1 | 7/2006 | Kudo |
| 2009/0246453 A1 | 10/2009 | Yamaguchi |

FOREIGN PATENT DOCUMENTS

| | | | |
|---|---|---|---|
| EP | 2335811 A1 | 6/2011 | |
| EP | 2452746 A1 * | 5/2012 | ......... B01D 39/2034 |
| EP | 2554234 A1 | 2/2013 | |
| JP | 2003286835 A2 | 10/2003 | |
| JP | 2006159134 A2 | 6/2006 | |
| JP | 2006239544 A2 | 9/2006 | |
| JP | 2009039632 A2 | 2/2009 | |
| JP | 200985010 | 4/2009 | |
| JP | 2009112962 A2 | 5/2009 | |
| JP | 2009255055 A2 | 11/2009 | |
| JP | 201111195 | 1/2011 | |
| JP | 2011218310 A2 | 11/2011 | |
| JP | 2012036821 A2 | 2/2012 | |
| WO | 2004076027 A1 | 9/2004 | |
| WO | 2010041741 A1 | 4/2010 | |
| WO | 2011125769 A1 | 10/2011 | |
| WO | 2014002772 A1 | 1/2014 | |

OTHER PUBLICATIONS

Japanese Notice of Allowance dated Aug. 16, 2016 issued in the corresponding Japanese patent application No. 2014-525251.
Extended European Search Report dated Nov. 28, 2016 issued in the corresponding European patent application No. 14800503.6.

* cited by examiner

DIESEL PARTICULATE FILTER AND EXHAUST GAS PURIFICATION DEVICE

TECHNICAL FIELD

The present invention relates to a diesel particulate filter (referred to as a "DPF") used for purifying an exhaust gas discharged from an internal combustion engine, more particularly, diesel engine, and an exhaust gas purification device using the same.

BACKGROUND ART

Exhaust gases discharged from a diesel engine contain sulfate based on a sulfur content in fuel, tar-like particulate matter (referred to as "PM") resulting from incomplete combustion, nitrogen oxides ($NO_x$), and the like.

As a device for removing the PM contained in the exhaust gas of the diesel engine, an exhaust gas purification device for collecting the PM using a DPF and burning away the collected PM with proper timing is known.

Such a DPF is typically designed such that a porous filter substrate exhibiting a honeycomb structure makes up framework, and when the exhaust gas circulates inside a dividing wall of the substrate, the PM is collected in the surface of the dividing wall.

With respect to a catalyst for the exhaust gas of the diesel engine, for example, the following inventions are disclosed.

For example, a method of purifying an engine exhaust gas is disclosed in Patent Document 1 (JP 2003-286835 A), in which a granular or monolithic denitration catalyst and oxidation catalyst supporting titanium and silver on alumina are disposed in series on an exhaust passage of the engine exhaust gas, and the engine exhaust gas is brought into contact with the denitration catalyst under the presence of a fuel reducing agent extracting a part of fuel and is then brought into contact with the oxidation catalyst.

A structure is disclosed in Patent Document 2 (JP 2006-239544 A), in which a coating layer is formed on a surface of a porous inorganic substrate such as cordierite, the coating layer being formed of oxide particles such as alumina having pores composed of inter-particle gaps of 10 nm to 200 nm and pore-communicating holes of 10 nm or less through which the pores communicate with each other, and a catalyst component is supported into the pores in the coating layer.

An exhaust gas purification device is disclosed in Patent Document 3 (JP 2009-112962 A), which purifies an exhaust gas discharged from an internal combustion engine and includes a gas channel through which the exhaust gas circulates and a particulate filter that is provided in the gas channel and is formed with numerous pores, wherein an approximately entire introduction face of the particulate filter brought into contact with the exhaust gas is covered with a microporous material in which micropores having a smaller diameter than the pores are formed, and the microporous material includes a carrier composed of an oxide having oxygen storage/release capacity and a catalyst containing Ag supported on the carrier.

An exhaust gas purification device is disclosed in Patent Document 4 (JP 2009-85010 A), which purifies an exhaust gas discharged from an internal combustion engine and includes a can channel through which the exhaust gas circulates and a particulate filter (DPF) that is provided in the gas channel and is formed with numerous pores, wherein an approximately entire introduction face of the particulate filter brought into contact with the exhaust gas is covered with a microporous material in which micropores having a smaller diameter than the pores are formed.

An exhaust gas purification filter is disclosed in Patent Document 5 (JP 2011-218310 A) which includes: an inflow surface through which an exhaust gas containing a particulate matter flows; a discharge surface from which purified gas is discharged; and a filter substrate made of a porous body, wherein the filter substrate includes porous dividing walls and gas channels surrounded by the dividing walls, a porous film having a pore size smaller than a size of pores of the dividing walls is provided on each surface of the dividing walls, and microgrooves having a depth shallower than the thickness of the porous film are formed on at least a part of a surface of the porous film.

CITATION LIST

Patent Documents

Patent Document 1: JP 2003-286835 A
Patent Document 2: JP 2006-239544 A
Patent Document 3: JP 2009-112962 A
Patent Document 4: JP 2009-85010 A
Patent Document 5: JP 2011-218310 A

SUMMARY OF THE INVENTION

Problems to be Solved by the Invention

A catalyst using a DPF had a problem that clogging of a filter was advanced with an increase of the amount of PMs to be collected, resulting in pressure loss. Therefore, as a measure for the clogging of the filter, method of regenerating the filter has been employed from the past, in which the DPF is heated using an electric heater or a burner to burn the collected PMs or a fuel is regularly burnt to burn the PMs when the pressure loss of a certain value or more occurs.

In the conventional DPF, however, the PMs are accumulated in an exhaust gas channel provided inside a dividing wall of a substrate, and as a result, there were problems that a flow of the exhaust gas become worse and thus a back pressure becomes higher.

In addition, as disclosed in Patent Document 5 described above, in the DPF in which the porous film having the pore size smaller than the size of pores of the dividing walls is provided on each surface of the dividing walls, the PMs are accumulated in the surface of the porous film, and as a result, there were problems that a flow of the exhaust gas become worse and thus a back pressure becomes higher Therefore, the invention relates to a diesel particulate filter in which an exhaust gas circulates into a dividing wall of a filter substrate and is to propose a novel diesel particulate filter which can prevent PMs from being accumulated on the surface and inside of the filter substrate, suppress an increase in a back pressure due to the exhaust gas, and stably exert PM combustion capacity.

Means for Solving Problem

The invention proposes a diesel particulate filter (referred to as a "DPF") in which an exhaust gas circulates into a dividing wall of a filter substrate, wherein the diesel particulate filter is configured to have an inorganic porous layer that contains a metal oxide or a metal composite oxide and is provided with a concavo-convex surface portion having a thickness 50% or more of a thickness of the inorganic porous layer, the inorganic porous layer being formed on a partial or entire surface of the dividing wall which is located at an inflow side of the exhaust gas.

Effect of the Invention

According to the DPF proposed by the invention, since it is provided with a concavo-convex surface portion having the thickness of 50% or more of the thickness of the inorganic porous layer, it is possible to collect the PMs. Moreover, since the exhaust gas flows through a gap caused by the concavo-convex surface portion, it is possible to prevent the increase in the back pressure due to the exhaust gas and to improve combustion efficiency of the accumulated PM particles as well.

In this case, when a catalyst (for example, silver or silver compound) for accelerating the combustion of the PMs is contained in the inorganic porous layer, the combustion of the PMs can be further accelerated.

MODE (S) FOR CARRYING OUT THE INVENTION

Next, a diesel particulate filter (referred to as a "present DPF") 1 will be described as an example of an embodiment of the invention.

<Present DPF>

The present DPF is a diesel particulate filter having a structure in which an inorganic porous layer 5 including a metal oxide or a metal composite oxide and provided with a concave-convex surface portion on a surface of a filter substrate 2 is formed on a partial or entire surface of a dividing wall 2a located at an inflow side of an exhaust gas in the filter substrate 2.

By the present DPF, the exhaust gas can circulate inside the dividing wall 2a of the filter substrate 2. At this time, particulate matters (PMs) contained in the exhaust gas are collected by the inorganic porous layer 5 on the surface of the dividing wall 2a, and the PM can be prevented from entering inside the dividing wall 2a. Moreover, the PM collected by the inorganic porous layer 5 can be burnt. At this time, since the exhaust gas can flow through gaps between particles in the concave-convex surface portion on the surface of the inorganic porous layer 5, it is possible to suppress an increase in a back pressure due to the exhaust gas and to improve combustion efficiency of the accumulated PM particles at the same time.

(Substrate 2)

Figure 1:
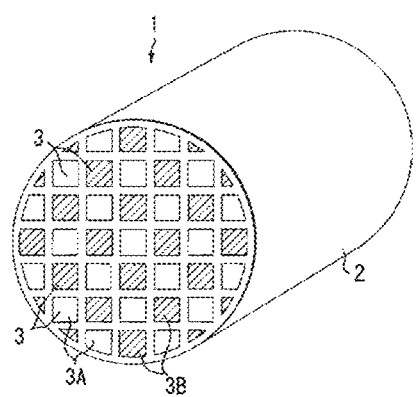
FIG. 1 is a schematic perspective view illustrating an example of a DPF of the invention.
Figure 2:
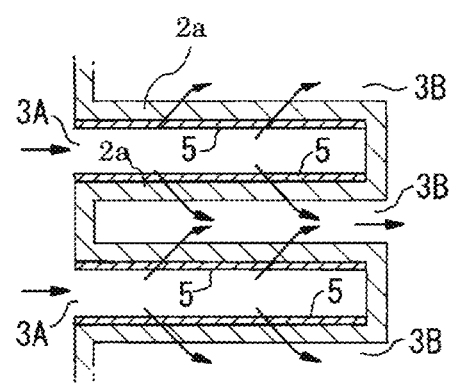
FIG. 2 is an enlarged cross-sectional view illustrating a part of the DPF illustrated in FIG. 1.

As illustrated in FIGS. 1 and 2, the filter substrate 2 forming a framework of the present DPF exhibits a honeycomb structure, and has multiple cells communicating with each other in a flow direction of the exhaust gas. The cells 3 are mutually partitioned by the dividing walls, and ends of the adjacent cells are alternately sealed. Thus, gas inflow cells 3A that are formed to open an upstream side of the exhaust gas and to block a downstream side of the exhaust gas and gas outflow cells 3B that are formed to block the upstream side of the exhaust gas and to open the downstream side of the exhaust gas are configured to be adjacently disposed via the dividing walls 2a of the substrate.

However, a shape of the filter substrate 2 of the present DPF is not limited to the shape as described above. For example a known substrate such as a wall through type, a flow through honeycomb type, a wire mesh type, a ceramic fiber type, a metal porous material type, a particle filling type, or a foam type may be employed as the DPF.

A material of the filter substrate 2 may be a porous material formed of a refractory material such as ceramic or a metal material.

The material of the ceramic substrate may include refractory ceramic materials, for example, silicon carbide (SiC), cordierite, cordierite-alpha alumina, silicon nitride, zircon mullite, spodumene, alumina-silica magnesia, zirconium silicate, sillimanite, magnesium silicate, zircon, petalite, alpha alumina, and aluminosilicates.

The material of the metal substrate may include refractory metals, for example, a stainless alloy, a Fe—Cr—Al alloy, mullite, alumina, and aluminum titanate.

Among them, the silicon carbide (SiC) is particularly preferred from the viewpoint of a permeation control effect that Fe is inhibited from permeating into the substrate due to Pd.

A formation density of the cells 3 is not particularly limited, but 10 to 100 cells are preferably formed per 1 $cm^2$ of substrate cross section.

(Inorganic Porous Layer 5)

The inorganic porous layer 5 is preferably an inorganic porous layer containing a metal oxide or a metal composite oxide and provided with a concave-convex surface portion having thickness of 50% or more of the thickness of the inorganic porous layer.

For example, in the case of the filter substrate 2 illustrated in FIGS. 1 and 2, the inorganic porous layer 5 is preferably formed on the partial or entire surface of the dividing wall of the gas inflow cell 3A. In this case, the inorganic porous layer 5 may be formed on the surface of the dividing wall 2a through which the exhaust gas flows among the dividing walls of the gas inflow cells 3A.

The metal oxide or the metal composite oxide contained in the inorganic porous layer 5 may include, for example, a metal oxide or a metal composite oxide containing at least one metal selected from the group consisting of aluminum, titanium, silica and zirconium, and cerium. For example, there is an inorganic porous material selected from the group consisting of silica, alumina, and titania compounds or a porous material made of an OSC material such as a cerium compound, a zirconium compound, or a ceria-zirconia composite oxide.

More specifically, for example, there is a porous material made of a compound selected from alumina, silica, silica-alumina, alumino-silicates, alumina-zirconia, alumina-chromia, and alumina-ceria.

Above all, the inorganic porous material made of a cerium-zirconium composite oxide in which the amount of cerium oxide is 5 to 50 wt % is particularly preferred.

Further, the inorganic porous material may contain an oxide of at least one atom selected from the group consisting of Nb, La, Fe, Pr, Ba, Ca, Mg, Sn, and Sr.

The inorganic porous layer 5 may contain a silver alloy including silver and palladium, as a catalytically active component.

If the inorganic porous layer 5 contains the silver alloy including the silver and the palladium, the PM collected in the inorganic porous layer 5 can be more effectively burnt by the function of combustion catalysis of the silver.

At this time, the silver is preferably contained at a rate of 1 g/L or more with respect to a substrate volume, more preferably 1.5 g/L or more or 10 g/L or less, and still more preferably 2.0 g/L or more.

In the silver alloy including the silver and the palladium, when the palladium of 1 wt % or more is contained with respect to the silver alloy, diffusion of the silver can be more effectively suppressed at a high temperature. Further, when the content of the palladium is 75 wt % or less in the silver alloy, there also no obstacle to a catalyst activity effect of the silver.

From such a viewpoint, the ratio of the silver to the palladium is more preferably 5:1 to 1:3.

The silver alloy may contain elements other than the silver and the palladium as far as the elements do not obstruct the effects of the silver and the palladium. For example, the silver alloy may contain either at least one element selected from the group consisting of Nb, La, Fe, Y, Pr, Ba, Ca, Mg, Sn, and Sr or an oxide thereof. In this case, the content of other elements is preferably set to 1 to 35% by mass in terms of not obstructing the effects of the silver and the palladium.

As for the inorganic porous layer 5, the silver alloy including the silver and the palladium preferably exists in a state of being supported on the inorganic porous material described above.

The inorganic porous layer 5 may include other components, for example, a binder component or a stabilizer component.

The binder component may include at least one binder component selected from the group consisting of $SiO_2$, $TiO_2$, $ZrO_2$, and $Al_2O_3$.

The stabilizer may include, for example an alkaline earth metal or an alkaline metal. Above all, one or two or more metals selected from the group consisting of magnesium, barium, boron, thorium, hafnium, silicon, calcium, potassium, sodium, cesium, and strontium can be employed.

The surface of the inorganic porous layer 5 may be formed with the concave-convex surface portion having a thickness of 50% or more of the thickness of the inorganic porous layer 5 in terms of suppressing the increase in the back pressure due to the exhaust gas flowing through the surface of the inorganic porous layer 5.

When the thickness of such a concavo-convex surface portion that is, the height from the bottom of the lowest concavity of the concavities to the convexity) is 50% or more of the thickness of the inorganic porous layer 5, it is possible to prevent the increase in the back pressure because the exhaust gas flows through the gap caused by the concavo-convex surface portion and to improve combustion efficiency of the accumulated PM particles as well because the exhaust gas flows into the concavo-convex surface portion.

From such a viewpoint, the thickness of the concavo-convex surface portion is preferably 50% or more of the thickness of the inorganic porous layer, more preferably 60% or more, still more preferably 65% or more, and most preferably 75% or more or 95% or less.

Figure 6:
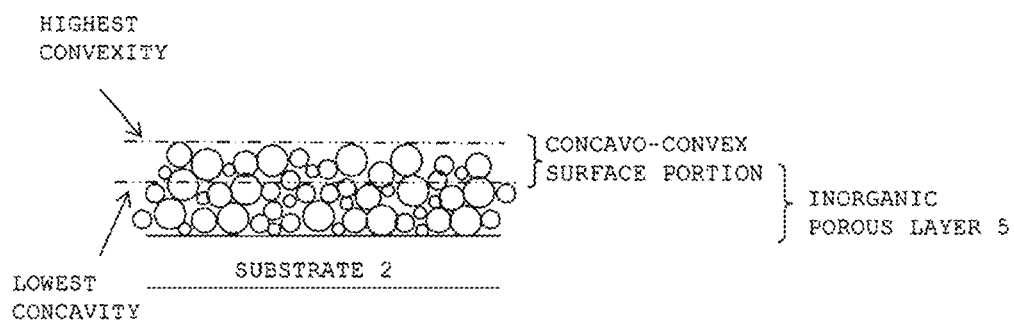
FIG. 6 is a schematic cross-sectional view illustrating an example of the DPF according to the invention.
Figure 7:
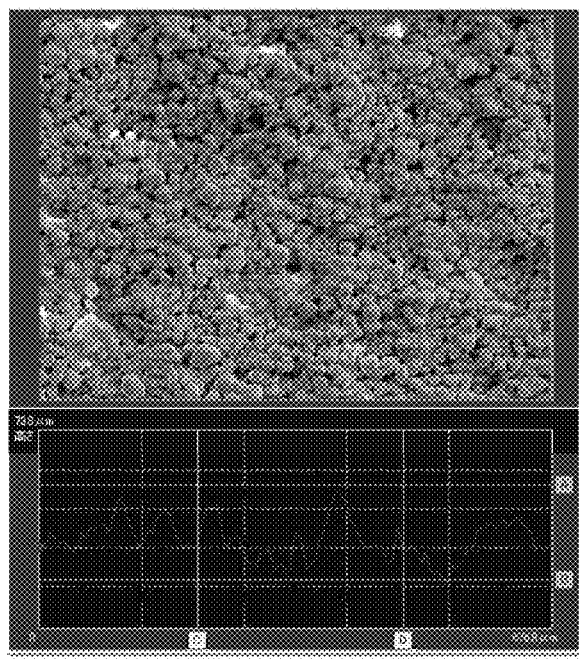
FIG. 7 is an analysis diagram illustrating an SEM image of a particulate filter (sample) of the invention taken from the above and a concavo-convex height of an inorganic porous layer in a horizontal line in the SEM image.

The thickness of the concavo-convex surface portion of the inorganic porous layer 5 is the height from the bottom of the lowest concavity (lowest concavity in FIG. 6) of the concavities to the highest convexity chest convexity is FIG. 6) as described above, and the thickness can be measured using, for example, "3D Real Surface View Microscope VE-8800" made by Keyence Corporation.

As a measurement principle, first, an SEM image is taken with a sample held horizontally from the above, and then another Say image is taken with the sample inclined at a given angle (θ). In this way, a movement distance of an arbitrary measurement point on the observed image is measured by the inclination of the sample at the angle θ to obtain a position of the arbitrary measurement point, tens of thousands of points corresponding to the arbitrary measurement point are automatically extracted and calculated from the observed image, a 3D image is established whereby the thickness the concave-convex surface portion is measured. The cross-section of the inorganic porous layer is taken by SEM, and thus the total thickness of the inorganic porous layer can be obtained.

As a method of forming the inorganic porous layer 5 provided with such a concavo-convex surface portion, an inorganic porous material powder made of the metal oxide or the metal composite oxide described above is mixed with water and the mixture is subject to a wet grinding treatment to obtain a ground slurry. Other components, for example, a binder component or a stabilizer component and a catalytically active component such as the silver alloy including, for example, the silver and the palladium are added to the ground slurry as needed to prepare a coating composition. The coating composition is subjected to coating and calcining, and thus the inorganic porous layer 5 can be formed.

In this case, by the control of grinding energy when the slurry is subjected to the wet grinding treatment, the thickness of the concavo-convex surface portion of the inorganic porous layer 5 can be adjusted. For example, when the slurry is ground using a ball mill, the grinding energy may be controlled by adjustment of a size of the ball mill, and the number proportion, the number of rotations, and a rotational time of the ball mill with respect to the amount of slurry. When the grinding energy is increased, the thickness of the concavo-convex surface portion of the inorganic porous layer 5 can be reduced.

The thickness of the inorganic porous layer 5 can be preferably 100 μm or less from the viewpoint of an initial pressure loss after the catalyst is coated, more preferably 70 μm or less, and most preferably 50 μm or less, as an example of the thickness. Since the invention can preferably be used for a catalyst in which the pressure loss easily becomes higher, it is further preferably applied to the inorganic porous layer 5 having the thickness of 10 μm or more and preferably 20 μm or more.

(Precious Metal Catalyst Layer 6)

Figure 3:
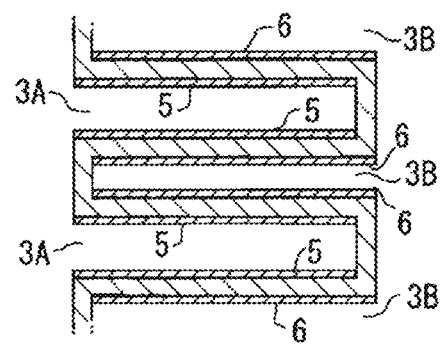
FIG. 3 is an enlarged cross-sectional view illustrating a part of the DPF according to a modification example of FIG. 1.

As illustrated in FIG. 3, the present DPF may be adapted to further laminate a precious metal catalyst layer 6 containing at least one precious metal selected from the group consisting of Pt, Pd, Ir, Au, and Rh and/or an oxide of the precious metal on the partial or entire surface of the dividing wall of the gas outflow cell 3B.

Figure 4:
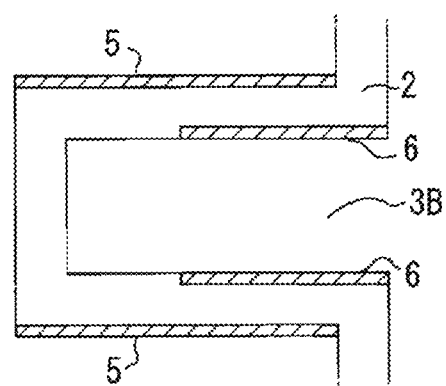
FIG. 4 is an enlarged cross-sectional view illustrating a part of the DPF according to a modification example of FIG. 3.

Further, as illustrated in FIG. 4, the precious metal catalyst layer 6 may be provided so as to be buried inward from the surface of the dividing wall of the gas outflow cell 3B. Further, some of the precious metal catalyst layer 6 may be provided on the surface of the dividing wall of the gas outflow cell 3B and the other may be provided so as to be buried in the surface of the dividing wall of each gas outflow cell 3B.

As the precious metal catalyst layer 6 is provided for a part or whole of the dividing wall of the gas outflow cell 3B, CO or HC that is an unburnt component of fuel added to raise a temperature of the exhaust gas can be efficiently treated by the precious metal catalyst layer 6.

However, the precious metal catalyst layer 6 is preferably provided as needed, and does not necessarily have to be provided.

When the precious metal catalyst layer 6 is provided in this way and the silver of the inorganic porous layer 5 is diffused to come into contact with the precious metal in the precious metal catalyst layer 6, the precious metal immediately loses catalyst activity. However, when Pd is contained in the present DPF, since the present DPF can suppress the diffusion of the silver, the precious metal can be prevented from being deactivated.

As the precious metal in the precious metal catalyst layer 6, any precious metal of Rh, Pt, Pd, Ir, and Au having higher electronegativity than the silver (Ag) is preferably employed alone or in combination with each other. Especially, Rh, Pt, and Pd are preferred, and are preferably used alone or in combination with each other.

The precious metal in the precious metal catalyst layer 6 is preferably contained within the range of 0.01 g to 10 g with respect to one liter of the volume of the porous substrate, and more preferably within the range of 0.1 g or more or 5 g or less. As the catalyst contains the precious metal at such an amount, the exhaust gas can be efficiently purified.

In the precious metal catalyst layer 6, the precious metal preferably exists in a state of being supported on the inorganic porous material.

Here, the inorganic porous material may include: for example, an inorganic porous material selected from the group consisting of silca, alumina, and titania compounds; or a porous material composed of an OSC material such as a cerium compound, a zirconium compound, or a ceria-zirconia composite oxide.

More specifically, the inorganic porous material may include, for example, a porous material composed of a compound selected from alumina, silica, silica-alumina, alumina-silicates, alumina-zirconia alumina-chromia, and alumina-ceria.

Above all, the inorganic porous material composed of a cerium-zirconium composite oxide in which the amount of cerium oxide is 5 to 50% by weight is particularly preferred. When the amount of cerium oxide exceeds 50% by weight, the specific surface area of the carrier is reduced when the inorganic porous material is heated to a high temperature, for example, a temperature of 700° C. or higher, and finally there is a tendency to cause heat deterioration of the catalyst.

Further, the inorganic porous material may contain an oxide of at least one atom selected from the group consisting of Nb, La, Fe, Y, Pr, Ba, Ca, Mg, Sn, and Sr.

The precious metal catalyst layer 6 may include other components, for example, a binder component and stabilizer component.

The binder component may include at least one binder component selected from the group consisting of $SiO_2$, $TiO_2$, $ZrO_2$, and $Al_2O_3$.

The stabilizer may include, for example an alkaline earth metal or an alkaline metal. Above all, one or two or more metals selected from the group consisting of magnesium, barium, boron, thorium, hafnium, silicon, calcium, and strontium can be employed.

A thickness of the precious metal catalyst layer 6 preferably ranges from 10 μm to 100 μm. If the precious metal catalyst layer 6 is too thick, a chance to bring the precious metal in the precious metal catalyst layer 6 and the exhaust gas into contact with each other is reduced, and thus decomposition efficiency is lowered. On the other hand, if the precious metal catalyst layer 6 is too thin, heat resistance is lowered. From such a viewpoint, the thickness of the precious metal catalyst layer 6 is more preferably 10 μm or more or 70 μm or less, and still more preferably 20 μm or more or 50 μm or less.

<Producing Method>

Next, an example of a method of producing the present DPF will be described.

As a method of forming the inorganic porous layer 5, an inorganic porous material powder made of the metal oxide or the metal composite oxide described above is mixed with water and the mixture is subject to a wet grinding treatment to obtain a ground slurry. Other components, for example, a binder component or a stabilizer component and a catalytically active component such as the silver alloy including, for example, the silver and the palladium are added to the ground slurry as needed to prepare a coating composition. The coating composition is applied to a partial or entire surface of the filter substrate, more particularly a partial or entire surface of the dividing wall of, for example, the gas inflow cell 3A and then is subjected to drying. The dried composition is subjected to calcining or reducing, and thus the inorganic porous layer may be formed, for example, in an oxidizing atmosphere such as oxygen-enriched air in air, for example, at 400 to 700° C. However, the method of forming the inorganic porous layer is not limited to such a method.

At this time, as described above, by the control of a grinding energy when the slurry is subjected to the wet grinding treatment, the thickness of the concavo-convex surface portion of the inorganic porous layer 5 can be adjusted. For example, when the slurry is ground using a ball mill, the grinding energy may be controlled by adjustment of a size of the ball mill, and the number proportion, the number of rotations, and a rotational time of the ball mill with respect to the amount of slurry. When the grinding energy is increased, the thickness of the concavo-convex surface portion of the inorganic porous layer 5 can be reduced.

For example, the silver solution in which silver and palladium are dissolved may be prepared in such a manner that the silver compound is dissolved in the solution to prepare the silver solution in which the silver is dissolved and the prepared silver solution is mixed with a solution in which palladium is dissolved.

As the silver compound, for example, silver nitrate, silver acetate, or silver fluoride may be used. As the solvent, acetic acid or ammonia water may be used.

On the other hand, as the solution in which the palladium is dissolved, for example, a palladium nitrate solution can be used.

The silver compound is reduced to metal silver from a solution of a soluble silver compound, and the metal silver is precipitated on a carrier. Thereby, the silver is attached onto the carrier as a fine particle and a surface area of the silver is thought to be increased. This effect is also considered to be obtained even when a carrier particle other than the above-described carrier particle is used, but it is particularly significant when the above-described carrier particle is used.

In this case, a reducing agent may include, for example, hydrazine, hydrosulfide, sodium thiosulfate, formalin, potassium nitrite, potassium hydrogen nitrite sodium nitrite, sodium hydrogen sulfite, ammonium, glucose, ferrous citrate solution, tannic acid, hydrazine hydrate, ethylenediaminetetraacetic acid, sodium tetrahydroborate, and hypophosphorous acid.

With regard to formation of the inorganic porous layer 5, it is preferred that no silver solution is adapted to permeate into the substrate as far as possible. The reason is that, if the silver in the silver solution permeates into the substrate to react with a substrate such as SiC, the silver is deactivated. However, since the substrate is porous, it is inevitable that the silver solution permeates somewhat into the substrate.

On the other hand, the precious metal catalyst layer 6 may be formed in such a manner that powder of an inorganic porous material such as silica or alumina is added to a solution, in which a precious metal is dissolved, to prepare a slurry and the slurry is applied to a partial or entire surface of the filter substrate, more particularly, to a partial or entire surface of the dividing wall of, for example the gas outflow cell 3B, and then is subjected to drying and calcining. However, the method of forming the precious metal catalyst layer 6 is not limited to such a method.

<Present Exhaust Gas Purification Device>

Next, an exhaust gas purification device using the present DPF described above (referred to as "present exhaust gas purification device") will be described.

Figure 5:
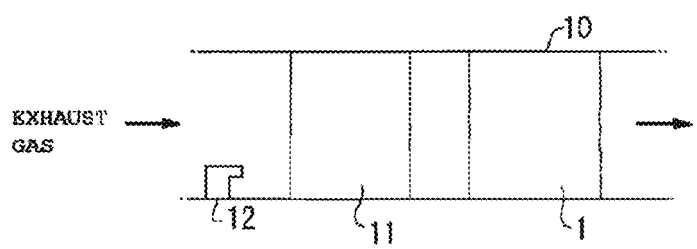
FIG. 5 a schematic cross-sectional view illustrating an example of an exhaust gas purification device of the invention.

For example, as illustrated in FIG. 5, the present exhaust gas purification device is preferably configured such that: the present DPF is disposed in a gas channel 10 through which an exhaust gas discharged from an internal combustion engine flows; a first catalyst structure 11 containing at least one precious metal selected from the group consisting of Pt, Pd, Ir, Au, and Rh and/or an oxide of the precious metal is disposed at an upstream side of the present DPF; and a heating means 12 for adjusting a temperature of the exhaust gas is disposed at an upstream side of the first catalyst structure 11.

In this case, the present DPF and the first catalyst structure 11 may be disposed in the same casing. Further, the present DPF and the first catalyst structure 11 may be disposed in different casings.

(First Catalyst Structure)

The first catalyst structure 11 may be formed using, for example, a porous ceramic substrate.

The porous ceramic substrate may be formed of, for example, cordierite, silicon carbide, or silicon nitride. Further, a metal honeycomb substrate may be effectively used as a substrate of a first oxidation catalyst 21.

As such a porous substrate (including the metal honeycomb substrate), a substrate having a form in which numerous through-holes (cells) are formed in a longitudinal direction and each of the through-holes is partitioned with dividing walls can be preferably used.

A thickness (T) of each dividing wall is preferably within a range from 10 to 300 μm.

Further, the porous substrate preferably has a wide contact area with the exhaust gas. A surface area of the substrate is preferably within a range from 10 to 50 $cm^2/cm^3$.

Such a porous substrate preferably uses a porous substrate having 15 to 200 cells per cross section of 1 $cm^2$.

A diameter of such a porous substrate may be appropriately adjusted to conform to a diameter of a catalyst-containing exhaust gas channel. However, a porous substrate having a diameter of about 90 to 98% of the exhaust gas channel diameter (inner diameter) that is a casing of a portion where the catalyst is provided is easily used. This is preferred because almost all of exhaust gas comes into contact with the catalyst and is exhausted.

The first catalyst structure 11 preferably contains any precious metals of Rh, Pt, Pd, Ir, and Au alone or in combination with each other. Above all, Rh, Pt, and Pd are preferred, and may be used alone or in combination with each other.

The precious metal as described above is preferably contained in the first catalyst structure 11 within the range from 0.1 g to 10 g with respect to one liter of the volume of the porous substrate, and more preferably within the range from 1 g to 5 g. As the catalyst contains the precious metal at such an amount, the exhaust gas can be efficiently purified.

The catalyst component fixed to the porous substrate preferably exists in a state of being supported on the inorganic porous material.

Here, for example, the inorganic porous material may include: an inorganic porous material selected from the group consisting of silica, alumina, and titania compounds; or a porous material composed of an OSC material such as a cerium compound, a zirconium compound, or a ceria-zirconia composite oxide.

The first oxidation catalyst may contain alumina or alumina composite oxide having heat resistance which is further reinforced.

(Heating Means)

When the exhaust gas circulates into the dividing wall 2a of the filter substrate 1, the PMs contained in the exhaust gas are collected by the inorganic porous layer 5. The PMs collected by the inorganic porous layer 5 can be heated to be burnt by a heating means 12.

The heating means 12 may include, for example, a means for directly spraying fuel used in the internal combustion engine Further, the present exhaust gas purification device may be configured to further dispose an $NO_x$ treating catalyst (not illustrated) in the rear. As the $NO_x$ treating catalyst is disposed, most of $NO_x$ can be treated and exhausted as $N_2$.

As the $NO_x$ treating catalyst used here, a urea SCR catalyst or an $NO_x$ catalyst may be used which is typically used.

<Explanation of Expressions>

In this specification, when the expression "X to Y" (X and Y are arbitrary numbers) is used, unless otherwise explicitly mentioned, the meaning of "X or greater but Y or less" is included and at the same time, the meaning of "preferably greater than X" or "preferably less than Y" is included.

In addition, the expression "X or greater" (X is an arbitrary number) or "Y or less" (Y is an arbitrary number) includes the intention of "it is preferable to be greater than X" or "it is preferable to be less than Y".

EXAMPLES

Hereinafter, the invention will be further described in detail based on the following Examples and Comparative Examples.

Example 1

A silver nitrate aqueous solution and a palladium nitrate aqueous solution were impregnated with $Al_2O_3$ (80 parts by mass) and were evaporated to dryness at 120° C. This material was calcined at 800° C. for 20 hours, and Ag and Pd were subjected to an alloying treatment to obtain AgPd alloy particulate firing catalyst powder. In this case, a mole ratio between Ag and Pd at the AgPd alloy was 5:1.

The AgPd alloy particulate combustion powder of 200 g, an alumina sol of 500 g having an alumina concentration of 20% by mass, and deionized water of 300 g were mixed with each other and the obtained mixture were subjected to a wet grinding treatment using a ball mill, thereby obtaining an AgPd slurry.

At this time, the ball mill was set to the following conditions: an alumina ball mill (size of 5 mm) was used; a number proportion of the ball mill with respect to the amount of the slurry was 30%; the number of rotations was 20 rpm; and a rotational time was 5 hours.

Paraffin dissolved by heat was impregnated with a SiC DPF (300 cells per square inch and a wall thickness of 12 mil) having a diameter of 143.8 mm and a length of 152.4 mm up to a position of 80% from an inlet side of the DPF in a lengthwise direction, and the extra paraffin was removed by suction. Then, the paraffin was cured by cooling. Thus, pores in dividing walls up to the position of 80% from the inlet side of the DPF in the lengthwise direction were filled with the paraffin. In order that air and the slurry were adapted to flow in the cells, the paraffin was not filled in 20% cell walls at an outlet side of the DPF.

A pressure was reduced from the outlet side of the DPF, and the AgPd slurry was pushed from the inlet side of the DPF and was injected into gas inflow cells. The surplus slurry was removed by suction. The slurry was dried at 70° C. for 3 hours, and the dried slurry was then calcined at 500° C. for one hour to remove the paraffin resulting in obtaining a particulate filter (sample) in which an inorganic porous layer provided with a concavo-convex surface portion was formed on an entire surface of the dividing walls up to the position of 80% from an inlet side of the as inflow cells in a lengthwise direction.

In this case, a thickness of the inorganic porous layer was 30 μm.

Example 2

A particulate filter (sample) was obtained in the same manner as in Example 1 except that the conditions of the ball mill in Example 1 were changed into the following conditions: an alumina ball mill (size of 5 mm) was used; a number proportion of the ball mill with respect to the amount of the slurry was 30%; the number of rotations was 30 rpm; and a rotational time was 5 hours. In this case, a thickness of the inorganic porous layer was 30 μm.

Example 3

A particulate filter (sample) was obtained in the same manner as in Example 1 except that the conditions of the ball mill in Example 1 were changed into the following conditions: an alumina ball mill (size of 10 mm) was used; a number proportion of the ball mill with respect to the amount of the slurry was 30%; the number of rotations was 20 rpm; and a rotational time was 5 hours. In this case, a thickness of the inorganic porous layer was 30 μm.

Comparative Example 1

A particulate filter (sample) was obtained in the same manner as in Example 1 except that the conditions of the ball mill in Example 1 were changed into the following conditions: an alumina ball mill (size of 20 nm) was used; a number proportion of the ball mill with respect to the amount of the slurry was 30%; the number of rotations was 40 rpm; and a rotational time was 5 hours. In this case, a thickness of the inorganic porous layer was 30 μm.

Comparative Example 2

A particulate filter (sample) was obtained in the same manner as in Example 1 except that the conditions of the ball mill in Example 1 were changed into the following conditions: the wet grinding was carried out using a disk mill (disk produced by Retsch) instead of the ball mill; the number of rotations was 500 rpm; and a rotational time was 10 minutes. In this case, a thickness of the inorganic porous layer was 30 μm.

<Concavo-Convex Surface Measurement of Coating Layer and Thickness of the Coating Layer>

In the particulate filters (samples) obtained in Examples and Comparative Examples, the thickness of the concavo-convex surface portion (concave-convex surface height) of the inorganic porous layer was measured on the following conditions and procedures using "3D Peal Surface View Microscope VE-8800" produced by Keyence Corporation as a measuring device.

(Measurement Conditions)
Magnification: 150 times
Object distance: 16.6 mm
Accelerating voltage: 2 kV
Detector: secondary electron detector
Atmosphere: vacuum (Measurement Procedures)
(1) The particulate filters (samples) obtained in Examples and Comparative Examples were sampled to a size of height 1 cm×width 2 cm×depth 2 cm. Then, the surface of the inorganic porous layer was adapted to be located on a surface.

(2) An SEN image was taken in a horizontal state from the above, and then another SEM image was taken with an angle inclined at 5 degrees.

(3) A thickness of the concavo-convex surface portion of the inorganic porous layer was calculated by software attached to the device from the taken SEM images.

(4) Subsequently, an SEM image was taken with a cell cross section of the sample adapted to face the surface (upper side).

(5) A thickness of the inorganic porous layer was calculated by the software attached to the device from the taken SEM image.

(6) The following relation was calculated from the numerical values calculated in the procedures of (3) and (4): A percentage (%) of the thickness of the concavo-convex surface portion with respect to the thickness of the inorganic porous layer={(thickness of concavo-convex surface)/(thickness coating aver)}×100.

<Soot Collecting Back Pressure Measuring Test>

With respect to the particulate filters (samples) obtained in Examples and Comparative Examples, a pressure drop increment (ΔkPa/hr) was measured according to the following method. The measured results are indicated in Table 1.

A cordierite honeycomb type oxidation catalyst (the amount of Pt to be supported: 2.4 g/L and the amount of Pd to be supported: 0.6 g/L) having a diameter of 143.8 mm and a length of 76.2 mm was installed at an upstream side of a mid-exhaust pipe of 2.4 L diesel engine, and the particulate filters (samples) obtained in Examples and Comparative Examples were disposed at a downstream side of the mid-exhaust pipe.

The diesel engine was operated with the number of rotations of 1100 rpm and a load of 140 Nm for one hour, and an increment (ΔkPa/hr) from an initial pressure drop (a pressure drop before soot collection) to a pressure drop after the engine was operated for one hour (a pressure drop after soot collection) was measured, and the results are indicated in Table 1.

Pressure drop increment (ΔkPa/hr)=(pressure drop after soot collection−pressure drop before soot collection)/soot accumulation time A determination was given by the following criteria, and the determined results are indicated in Table 1.
○○○: 4.0 ΔkPa/hr or less
○○: 4.0 ΔkPa/hr or more and less than 5 ΔkPa/hr
○: 5 or more and less than 6.5
Δ: 6.5 or more and less than 8
x: 8ΔkPa/hr or more

TABLE 1

| | Grinding energy | Percentage of thickness of concavo-convex surface portion with respect to thickness of inorganic porous layer (%) | Pressure drop incremental rate (ΔkPa/hr) | Evaluation |
|---|---|---|---|---|
| Example 1 | BM (small ball); number of rotations-small | 77.9 | 3.2 | ○○○ |
| Example 2 | BM (small ball); number of rotations-middle | 68.9 | 4.2 | ○○ |
| Example 3 | BM (middle ball); number of rotations-small | 55.0 | 6.0 | ○ |
| Comparative Example 1 | BM (large ball); number of rotations-large | 46.1 | 9.0 | x |
| Comparative Example 2 | Disk mill | 39.1 | 10.4 | x |

It was found that, as the concavo-convex surface portion having the thickness of 50% or more of the thickness of the inorganic porous layer was formed on the surface of the inorganic porous layer formed on the surface of the DPF dividing wall, the exhaust gas flowed through the gap caused by the concavo-convex surface portion, and thus the back pressure could be suppressed from being raised by the exhaust gas. Simultaneously, it was found that the combustion efficiency of the accumulated PM particles could also be improved.

The invention claimed is:

1. A diesel particulate filter in which an exhaust gas circulates into a dividing wall of a filter substrate,
wherein the diesel particulate filter is configured to have an inorganic porous layer that is provided with a concavo-convex surface portion containing an inorganic porous material particle made of a metal oxide or a metal composite oxide, the concavo-convex surface portion having a thickness of 50% or more of a thickness of the inorganic porous layer, the inorganic porous layer being formed on a partial or entire surface of the dividing wall which is located at an inflow side of the exhaust gas, and
the inorganic porous layer comprises a silver alloy including silver and palladium, as a catalytically active component, and the silver alloy exists in a state of being supported on the inorganic porous material particle contained in the inorganic porous layer.

2. A diesel particulate filter comprising a filter substrate with a structure in which gas inflow cells that are formed to open an upstream side of an exhaust gas and to block a downstream side of the exhaust gas, and gas outflow cells that are formed to block the upstream side of the exhaust gas and to open the downstream side of the exhaust gas are provided to be adjacent to each other via a dividing wall of the substrate,
wherein the diesel particulate filter is configured to have an inorganic porous layer that is provided with a concavo-convex surface portion containing an inorganic porous material particle made of a metal oxide or a metal composite oxide, the concavo-convex surface portion having a thickness of 50% or more of a thickness of the inorganic porous layer, the inorganic porous layer being formed on a partial or entire surface of a dividing wall of the gas inflow cell, and
the inorganic porous layer comprises a silver alloy including silver and palladium, as a catalytically active component, and the silver alloy exists in a state of being supported on the inorganic porous material particle contained in the inorganic porous layer.

3. The diesel particulate filter according to claim 1, wherein the surface of the inorganic porous layer comprises a concavo-convex surface portion having a thickness of 60% or more of the thickness of the inorganic porous layer.

4. The diesel particulate filter according to claim 1, wherein the thickness of the inorganic porous layer is 100 μm or less.

5. The diesel particulate filter according to claim 1, wherein a precious metal catalyst layer comprising at least one precious metal selected from the group consisting of Pt, Pd, and Rh and/or an oxide of the precious metal is provided as a catalytically active component on the partial or entire surface of the dividing wall of the gas outflow cell.

6. An exhaust gas purification device comprising the diesel particulate filter according to claim 1.

7. An exhaust gas purification device having a catalyst structure containing at least one precious metal selected from the group consisting of Pt, Pd, and Rh and/or an oxide of the precious metal at an upstream side of the diesel particulate filter according to claim 1 in a gas channel through which an exhaust gas discharged from an internal combustion engine flows.

8. The diesel particulate filter according to claim 1, wherein the silver alloy exists in a state of being supported on the inorganic porous material particle existing both at a surface and inside of the inorganic porous layer.

9. The diesel particulate filter according to claim 2, wherein the silver alloy exists in a state of being supported on the inorganic porous material particle existing both at a surface and inside of the inorganic porous layer.

10. A diesel particulate filter in which an exhaust gas circulates into a dividing wall of a filter substrate, the diesel particulate filter comprising:
the filter substrate comprising the dividing wall; and
an inorganic porous layer on a partial or entire surface of the dividing wall which is located at an inflow side of the exhaust gas, wherein the inorganic porous layer comprises a concavo-convex surface portion consisting of carrier particles on which a silver alloy including silver and palladium, as a catalytically active component, is supported, the carrier particles being an inorganic porous material made of a metal oxide or a metal composite oxide, and the concavo-convex surface portion has a thickness of 50% or more of a thickness of the inorganic porous layer.

\* \* \* \* \*